United States Patent
Zhou

(10) Patent No.: US 8,535,509 B2
(45) Date of Patent: Sep. 17, 2013

(54) MEMBRANE RESTORATION

(75) Inventor: Jianqing Zhou, Buxtehude (DE)

(73) Assignee: Dow Global Technologies LLC, Midland, MI (US)

( * ) Notice: Subject to any disclaimer, the term of this patent is extended or adjusted under 35 U.S.C. 154(b) by 504 days.

(21) Appl. No.: 12/688,280

(22) Filed: Jan. 15, 2010

(65) Prior Publication Data

US 2010/0187127 A1    Jul. 29, 2010

Related U.S. Application Data

(60) Provisional application No. 61/205,754, filed on Jan. 23, 2009.

(51) Int. Cl.
*B01J 49/00* (2006.01)
*C25B 15/08* (2006.01)
*C23F 13/00* (2006.01)

(52) U.S. Cl.
USPC .......... 205/687; 205/688; 205/702; 205/703; 205/724

(58) Field of Classification Search
USPC .................... 205/687, 688, 702, 703, 724
See application file for complete search history.

(56) References Cited

U.S. PATENT DOCUMENTS

| | | | |
|---|---|---|---|
| 3,630,863 A | 12/1971 | Jeffery et al. | |
| 3,988,223 A * | 10/1976 | Hirozawa | 205/350 |
| 4,040,919 A | 8/1977 | Eng | |
| 4,381,230 A | 4/1983 | Burney, Jr. et al. | |
| 4,919,791 A | 4/1990 | Miles et al. | |

FOREIGN PATENT DOCUMENTS

| | | |
|---|---|---|
| CN | 1736567 | 2/2006 |
| CN | 1736567 A | 2/2006 |
| JP | 56-073547 * | 6/1981 |
| JP | 4056794 | 2/1992 |
| JP | 200001794 | 1/2000 |
| JP | 2000001794 | 1/2000 |
| JP | 2006052434 | 2/2006 |

OTHER PUBLICATIONS

International Search Report and Written Opinion from related PCT Application PCT/US 2009/000094, dated Apr. 1, 2010 (14 pgs).

* cited by examiner

*Primary Examiner* — Arun S Phasge
(74) *Attorney, Agent, or Firm* — Brooks, Cameron & Huebsch, PLLC

(57) ABSTRACT

Embodiments include membrane restoration process. A membrane can be restored by replacing an anolyte and a catholyte of a cell with a solution having an organic acid. The cell can include an anode, a cathode and a membrane fouled with a metal. A cheleate can be formed with the metal and the organic acid of the solution and an electric current can be provided between the anode and the cathode of the cell to protect the cell from corrosion while forming the chelate.

16 Claims, 1 Drawing Sheet

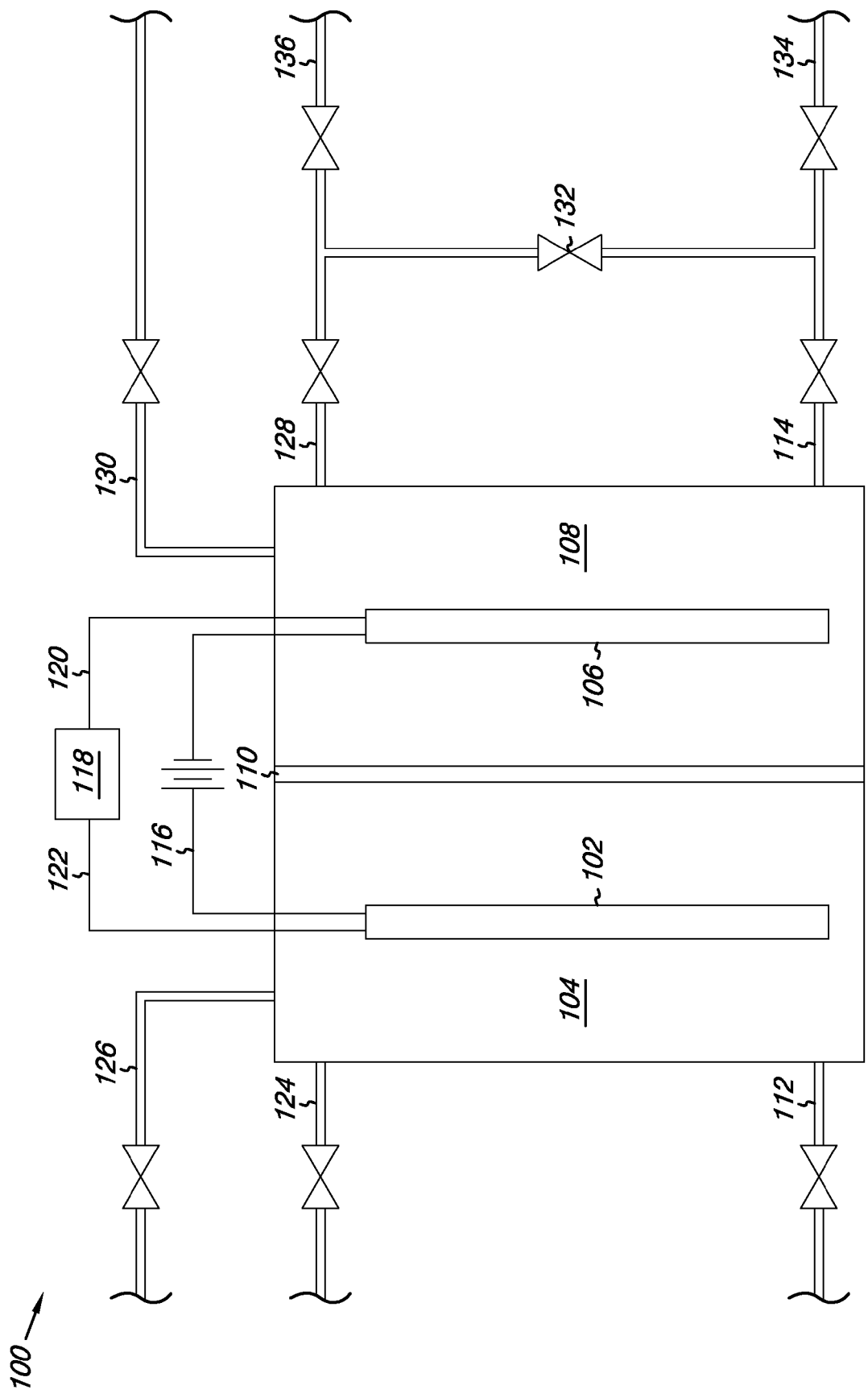

MEMBRANE RESTORATION

This application claims priority from U.S. Provisional Application Ser. No. 61/205,754 filed Jan. 23, 2009, the entire content of which is incorporated herein by reference.

FIELD OF DISCLOSURE

The disclosure relates to a membrane restoration process and membranes that have been restored by the membrane restoration process, and in particular a membrane restoration process that restores membranes used in an electrochemical process.

BACKGROUND

The chlor-alkali industry has used three processes for the production of chlorine, hydrogen, and caustic soda from brine: a mercury cell process, a diaphragm cell process, and a membrane cell process. The mercury cell process and the diaphragm cell process can both generate hazardous wastes that can include mercury or asbestos, and thus are often disfavored.

The membrane cell process utilizes a membrane which allows sodium ions to pass into the cathodic compartment where a reaction with hydroxyl ions can form caustic soda. The performance of the membrane used in the cell will deteriorate over time and possibly result in undesirable effects that can include an increase of cell voltage, decreased caustic current efficiency, and an increase in power consumption.

Replacing the membrane is often a costly and labor intensive process that can require significant down-time for the membrane cell and result in substantial production losses. As such, there is a need in the chlor-alkali industry for alternatives to replacing a cell membrane, while at the same time providing an opportunity for a reduction in production costs, a performance improvement, an increase in production rate, or a prolongation of the membrane's operational lifetime.

SUMMARY

The present disclosure provides embodiments of a membrane restoration process. Embodiments of the present disclosure can provide a restored membrane, obtainable by one or more of the processes described herein.

According to the embodiments of the present disclosure a membrane restoration process can include protecting a cathode in a cell having a membrane with an electric current applied between an anode and the cathode of the cell, chelating metal ions deposited on the membrane with a solution having an organic acid while protecting the cathode, and removing the chelated metal ions from the cell.

According to the embodiments of the present disclosure a restored membrane can be obtained by the membrane restoration process.

The embodiments of the present disclosure can also include a membrane restoration process that includes replacing an anolyte and a catholyte of a cell with the solution having an organic acid, where the cell includes an anode, a cathode and a membrane fouled with a metal; forming a chelate with the metal and the organic acid of the solution; and providing an electric current between the anode and the cathode of the cell to protect the cell from corrosion while forming the chelate.

According to the embodiments of the present disclosure the solution can include a strong base. For the various embodiments, the strong base can be selected from the group of alkalis, alkaline earth metal hydroxides, and a combination thereof. According to the embodiments of the present disclosure the organic acid can be selected from the group of oxalic acid, citric acid, acetic acid, and a combination thereof. According to the embodiments of the present disclosure the solution can have a pH of about 2 to about 7.

According to the embodiments of the present disclosure the solution can replace an anolyte and a catholyte so that the solution can remain in the cell for a time of about 0.5 hours to about 48 hours. According to the embodiments of the present disclosure, the solution can be maintained at a temperature of about 0° C. to about 90° C. According to the embodiments of the present disclosure the solution can be maintained at a temperature of about 20 degrees Celsius (° C.) to about 70° C.

According to the embodiments of the present disclosure, a method for protecting a cathode of a cell from corrosion can include contacting the anode, the cathode, and the membrane of the cell with a solution having a solute that can form a chelate with a metal that fouls the membrane, and providing a cell voltage between the anode and the cathode to protect the cathode of the cell from corrosion while the solute forms a chelate with the metal that fouls the membrane.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

As used herein, "a," "an," "the," "at least one," and "one or more" are used interchangeably. The terms "includes" and "comprises" and variations thereof do not have a limiting meaning where these terms appear in the description and claims. Thus, for example, a solution that includes "an" organic acid can be interpreted to mean that the solution includes "one or more" organic acids.

The term "and/or" means one, one or more, or all of the listed elements.

Also herein, the recitations of numerical ranges by endpoints include all numbers subsumed within that range (e.g., about 1 to about 5 includes 1, 1.5, 2, 2.75, 3, 3.80, 4, 5, etc.).

BRIEF DESCRIPTION OF THE FIGURES

FIG. 1 illustrates an embodiment of a cell that includes a membrane which may be restored according to one or more embodiments of the present disclosure.

DETAILED DESCRIPTION

Electrolysis is an electrochemical process which involves the passage of an operating electrical current through an electrolyte with subsequent migration of positively and negatively charged ions to the negative and positive electrodes. During electrolysis there can be a decomposition of compounds in the electrolyte that result in production of one of more different chemicals and/or different compounds. One example of such an electrolysis process is the electrolysis of brine to chlorine and sodium hydroxide.

FIG. 1 illustrates an embodiment of a cell 100 that can be used for electrolysis. The cell can also be referred to, among other things, as a membrane cell or an electrochemical reactor. The cell 100 can include an anode 102 located in an anolyte compartment 104, and a cathode 106 located in a catholyte compartment 108. To be useful for electrolysis the electrodes, the anode 102 and the cathode 106, should be electrically conductive. The anode 102 is the positive electrode and the cathode 106 is the negative electrode.

An electrolyte is a substance that behaves as an electrical conductor. Electrolytes can consist of ions in solution, and are sometimes referred to as ionic solutions; however molten electrolytes and solid electrolytes are also known. When the operating electrical current is applied between the anode 102 and the cathode 106 of the cell 100 an anolyte, which is an electrolyte in the anolyte compartment 104, and a catholyte, which is an electrolyte in the catholyte compartment 108, can conduct the operating electrical current such that a chemical reaction occurs at the cathode 106 which consumes electrons from the cathode 106 and produces a cathode reaction product, and another reaction occurs at the anode 102 which produces electrons to be taken up by the anode 102 and produces an anode reaction product. During electrolysis positively-charged ions, called cations, move towards the cathode 106, whereas negatively-charged ions, called anions, move toward the anode 102.

As illustrated by FIG. 1, a membrane 110 can separate the anolyte compartment 104 and the catholyte compartment 108 of cell 100. For the various embodiments, the membrane 110 can be ion permeable and selective, which is able to permit ions of a particular electrical charge to pass through the membrane. Cation exchange membranes allow cations to pass through, while anion exchange membranes allow anions to pass through.

Considerations for membrane 110 can include: ionic selectivity such that the membrane be permeable for counter ions and impermeable to co-ions; low electrical resistance such that the permeability of the membrane for counter ions is as high as possible; mechanical and dimensional stability such that the membrane is resistant to damage and has a low degree of swelling on transition from dilute to concentrated ionic solutions; and chemical stability such that the membrane is stable over differing pH values and in the presence of oxidizing agents. For the various embodiments, the membrane 110 can be a cation exchange membrane that has negatively charged groups fixed to a polymer matrix of the membrane 110. For the embodiments, examples of such membranes include, but are not limited to, the Asahi Kasei F4401 membrane (available from Asahi Kasei Chemicals Corporation), Tokyo, Japan, the NAFION® 900 Series membranes (available from Dupont, Nation Global Customer Service, Fayetteville, N.C.), and the Asahi Glass F8000 Series membranes (available from Asahi Glass Corporation, Tokyo, Japan). Other membranes, including but not limited to ion exchange membranes used in electrolytic processes, can also be considered to be within the scope of the present disclosure.

For the various embodiments, the membrane 110 separates the anolyte compartment 104 and the catholyte compartment 108 of cell 100 and can further separate the anode reaction product and the cathode reaction product. In some embodiments, the membrane 110 can allow passage of cations, such as sodium ions, water, and other uncharged species from the anolyte compartment 104 to the catholyte compartment 108, while resisting the passage of anions, such as chloride and hydroxide. The migration of ions through the membrane 110 can be driven by the operating electrical current applied between the anode 102 and the cathode 106 via electrical connection 116.

The performance of the membrane 110 in the cell 100 for an electrochemical process can deteriorate over time. One cause of deterioration in the membrane's performance can be due to fouling of the membrane 110. A fouled membrane can be a membrane that has been subject to an accumulation, a precipitation, and/or a deposition of a material. For the various embodiments, the material can be a metal. For the various embodiments, the metal can be a metal ion, including, but not limited to, calcium, magnesium, strontium, barium, aluminum, or combinations thereof. Such a material can change a membrane's performance and can be considered as a contaminant to the electrochemical process. Contaminants to the electrochemical process can occur from a number of sources including, but not limited to, materials used in the construction of the cell 100, components of the cell 100, and influents to the cell 100. For the various embodiments, inputs to cell 100 can include anolyte compartment input 112 and catholyte compartment input 114, both of which can provide influents to the cell 100.

For the various embodiments, the cell 100 can include a cathode protection rectifier 118 to protect the cathode 106. For the various embodiments, to protect the cathode 106 the cathode protection rectifier 118 can provide an electric current between the anode 102 and the cathode 106 of the cell 100. Protecting the cathode 106, as provided by the cathode protection rectifier 118, can reduce and/or prevent the corrosion of a metal surface, such as the cathode 106 of the cell 100, when the membrane 110 is being restored according to the embodiments of the present disclosure.

According to the embodiments of the present disclosure, a membrane restoration process can include protecting the cathode 106 with an electric current applied between the anode 102 and the cathode 106 of the cell 100. The anode 102 can be electrically connected to the metal surface that is to be protected, e.g., cathode 106, and the electric current can be applied between the anode 102 and the cathode 106 so that all areas of the metal surface to be protected become cathodic and therefore minimize or prevent corrosion. For the various embodiments, electrical connection 120 and electrical connection 122 electrically connect the anode 102 and the cathode 106 via cathode protection rectifier 118. The cathode protection rectifier 118 can provide that the electric current applied between the anode 102 and the cathode 106 is a direct current. The electric current applied between the anode 102 and the cathode 106 of the cell 100 via electrical connection 120 and electrical connection 122 can be applied to achieve a cell voltage between the anode 102 and the cathode 106. As will be appreciated, the cell voltage can have differing values for differing electrochemical processes. For example, a cell voltage of about 1.6 volts to about 2.0 volts can be provided between the anode 102 and the cathode 106 of cell 100. In some embodiments, the electric current applied between the anode 102 and the cathode 106 to protect the cathode 106 can be applied when the operating electrical current applied between the anode 102 and the cathode 106 via electrical connection 116 is stopped.

Embodiments of the membrane restoration process can include chelating metal ions deposited on the membrane 110 with a solution having an organic acid while protecting the cathode 106. As will be appreciated by one having ordinary skill in the art, a chelate is a complex in which a metal ion is bound by two or more atoms of a chelating agent. Some organic acids, including an organic acid selected from the group of oxalic acid, citric acid, acetic acid, and a combination thereof, have a chelating capacity and can be considered chelating agents. Chelating metal ions, or chelate formation, can occur when a solution that includes a chelating agent, such as an organic acid, contacts a metal ion as discussed herein.

Blistering of a membrane is a form of mechanical damage to the membrane 110 that can lead to a reduction in cell 100 performance or even necessitate remembraning of the cell 100. Blistering of a membrane can be caused by over acidification. Over acidification can occur when the membrane 110 is contacted by an acid having a concentration greater than or equal to a blistering concentration for the acid and the particular membrane 110 such that hydrogen ions create resistance to the passage of sodium ions through the membrane 110 during an electrochemical process that follows a membrane restoration process.

To reduce the possibility of blistering of the membrane 110 and/or to reduce the possibility of damaging the cathode 106 of the cell 100 when a solution contacts the membrane 110 and the cathode 106 of the cell 100, the solution can include an organic acid diluted with water, such as deionized water, to a predetermined molarity. For example, oxalic acid can be diluted with deionized water to a molarity of about 0.05 to about 0.22. As described herein, the organic acid in the solution used in the membrane restoration process can be referred to as a weak acid. A weak acid, as is understood by one skilled in the art, is an acid that does not completely dissociate in an aqueous solution. As such, the weak acid and its conjugate base in the solution can provide a buffer solution for the embodiments of the present disclosure. For the various embodiments, a strong base can be added to the buffer solution of organic acid and deionized water such that the resulting solution has a pH of about 2 to about 7 to provide the solution of the present disclosure. For the various embodiments, the strong base can be selected from the group of alkalis, alkaline earth metal hydroxides, and a combination thereof. For the various embodiments, the strong base can be sodium hydroxide, which can be added to a 0.2 molar solution of oxalic acid and deionized water to form a solution having a pH of about 5. For the various embodiments, the sodium hydroxide can be added as a solution that contains about 32 weight percent sodium hydroxide, based on the total solution weight. For the various embodiments, the solution used to perform the membrane restoration process can chelate a metal that fouls the membrane 110, while also ensuring that the membrane 110 does not become over acidified and/or blistered when an electrochemical process is re-established in the cell 100 following the membrane restoration process. For the various embodiments, the cathode 106 of the cell 100 can be protected from corrosion when the anode 102, the cathode 106, and the membrane 110 are contacted with the solution having a solute that can form a chelate with a metal that fouls the membrane 110 and a cell voltage between the anode 102 and the cathode 106 is provided while the solute forms a chelate with the metal that fouls the membrane 110.

According to the embodiments of the present disclosure, the membrane restoration process can include replacing an anolyte and a catholyte of a cell 100 with the solution having the organic acid, as provided herein, where the cell 100 includes the anode 102, the cathode 106, and the membrane 110 fouled with a metal. As discussed herein, the anolyte and the catholyte can be in the anolyte compartment 104 of the cell 100 and the catholyte compartment 108 of the cell 100 respectively, where the anolyte compartment 104 and the catholyte compartment 108 are separated by the membrane 110, and where the membrane 110 can be a fouled with the contaminant such as a metal, as discussed herein.

Replacing the anolyte and the catholyte of the cell 100 with the solution, as discussed herein, can provide proximity for the solution and the metal in the cell 100 such that a chelate can be formed. For example, the solution containing the organic acid can replace the anolyte and the catholyte so that the solution contacts the membrane 110 that has become fouled so that a chelate can be formed of the metal and the organic acid. As will be appreciated, the solution that replaces the anolyte and the catholyte can also contact the anolyte compartment 104, the anode 102, the catholyte compartment 108, and the cathode 106. As such, a metal, including metal ions, in the cell 100 can form a chelate with the organic acid of the solution that replaces the anolyte and the catholyte.

According to the embodiments of the present disclosure, the solution can remain in the cell 100 for about 0.5 hours to about 48 hours. As such, for the various embodiments, the anolyte and the catholyte can be replaced by the solution, as discussed herein, for about 0.5 hours to about 48 hours, for about 2 hours to about 24 hours, for about 6 hours to about 10 hours, or for about 8 hours. Providing that the solution remains in the cell 100 for an interval of time shorter than some interval of time provided herein can result in chelate quantities that are less than a theoretical chelate quantity to a degree that may be considered significant. Providing that the solution remains in the cell 100 for an interval of time longer than some intervals of time provided herein can result in an extended downtime for the cell 100 during which a negligible chelate quantity increase may be observed.

The embodiments of the present disclosure can also include maintaining the solution in the cell 100 at a temperature of about 0° C. to about 90° C. As such, for the various embodiments, the anolyte and the catholyte can be replaced by the solution, as discussed herein, and the solution can be maintained at a temperature of about 0° C. to about 90° C., at a temperature of about 20° C. to about 70° C., at a temperature of about 40° C. to about 60° C., at a temperature of about 50° C., or at a temperature of about 45° C. Maintaining the solution at a temperature that is below a temperature provided herein can result in chelate quantities that are less than a theoretical chelate quantity to a degree that may be considered significant. Maintaining the solution at a temperature that is above a temperature provided herein can result in damage to the membrane due to overexpansion of the membrane and/or greater utility expenditure while providing no chelate quantity increase or a negligible chelate quantity increase.

The embodiments of the present disclosure can include removing chelated metal ions from the cell 100. As such, when the anolyte and the catholyte of the cell 100 have been replaced by the solution, as discussed herein, in accordance with the embodiments described herein, the solution containing chelated metal ions can be removed from the anolyte compartment 104 and the catholyte compartment 108 of the cell 100, thus removing the chelated metal ions from the cell 100. For example, after the solution has remained in the cell 100 for about 0.5 hours to about 48 hours the solution can be removed from the anolyte compartment 104 and the catholyte compartment 108 of cell 100. After the solution has been removed from the cell 100, the cell 100 can be flushed with water, for example, deionized water.

As described herein, the electrochemical process can occur in the cell 100 and, as is appreciated, an electrochemical process can also occur in an electrolyzer, wherein multiple cells are combined into a single unit. For example, the electrochemical process can occur in a bipolar electrolyzer where the cathode 106 of the cell 100 is connected directly to an anode of an adjacent cell or the electrochemical process can occur in a monopolar electrolyzer where the anodes and cathodes are connected in parallel.

For the various embodiments, the cell 100 can include an anolyte compartment liquid phase output 124, an anolyte compartment gas phase output 126, a catholyte compartment liquid phase output 128, and a catholyte compartment gas phase output 130 such that contents of the anolyte compartment 104 and/or the catholyte compartment 108 can be removed from the cell 100. For the embodiments, the cell 100 can also include a return 132 such that a portion of a liquid removed from the catholyte compartment 108 via catholyte compartment liquid phase output 128 can be returned to the catholyte compartment 108 via the return 132 that is able to feed catholyte compartment input 114. For the embodiments, supplementary liquid input 134 can be included and may be utilized to alter a concentration and/or a composition of the portion of the liquid that can be returned to the catholyte compartment 108 via catholyte compartment input 114 by inputting a supplementary liquid. For example the portion of the liquid being returned to catholyte compartment 108 can be diluted by the input of a supplementary liquid such as water. When the supplementary liquid is water, the water can be deionized water. For the embodiments, liquid product output 136 can be included and can provide that a portion of the liquid removed from the catholyte compartment 108 is not returned to the catholyte compartment 108.

A chlor-alkali process is the production of chlorine, hydrogen, and caustic soda from brine. As used herein, a brine can include water saturated with a salt or water having a high concentration of a salt that is less than the saturation concentration. The chlor-alkali process can occur in the embodiments of the cell 100 and, as will be appreciated by one having ordinary skill in the art, the chlor-alkali process can also occur in an electrolyzer.

In the chlor-alkali process brine can be fed, via anolyte compartment input 112, into the anolyte compartment 104 so that chlorine gas is produced at the anode 102 and is removed from the cell 100 via anolyte compartment gas phase output 126.

A current density can quantify the operating electrical current applied between the anode 102 and the cathode 106 via electrical connection 116. The operating electrical current applied between the anode 102 and the cathode 106 via electrical connection 116 can cause hydrated sodium ions to migrate through the membrane 110 and into the catholyte compartment 108. In the chlor-alkali process a current density can have a value in a range of about 1.5 kiloampere/square meter ($kA/m^2$) to about 8.0 $kA/m^2$. Hydrogen gas can be produced at the cathode 106 and removed from cell 100 via the catholyte compartment gas phase output 130 to leave hydroxyl ions in the catholyte compartment 108. The hydroxyl ions together with permeating sodium ions constitute caustic soda that can be removed from catholyte compartment 108 via the catholyte compartment liquid phase output 128. A portion of the caustic soda can be returned to the catholyte compartment 108 via the return 132 that is able to feed catholyte compartment input 114. The portion of caustic soda returned to the catholyte compartment 108 may be diluted by the addition of deionized water via supplementary liquid input 134. The portion of caustic soda not returned to catholyte compartment 108 can be removed as product via liquid product output 136. Depleted brine, that is brine having a lower concentration of sodium chloride than the brine fed to cell 100 via anolyte compartment input 112, can be removed from the anolyte compartment 104 via the anolyte compartment liquid phase output 124.

The performance of the cell 100 can be affected by operating conditions that can include, but are not limited to, the concentration of the anolyte, the concentration of the catholyte, the operational current density, operational temperatures, contaminates in the cell process, and a membrane that has been fouled with contaminates, as discussed herein.

Determining the performance of a membrane 110 can include determining a caustic soda current efficiency (CCE). A CCE can be determined by a direct measurement of the quantity of caustic soda produced in relation to a theoretical value of caustic soda produced or by an anodic balance that accounts for the compositions of the anode gas and the anolyte. An anodic balance is provided as Equation 1.

$$CCE(\%, NaOH) = 100 - \eta O_2 - \eta ClO_3 - \eta ClO + \eta NaOH + \eta Na_2CO_3 \quad \text{Equation 1.}$$

Where $\eta O2$, $\eta ClO_3$, and $\eta ClO$ represent the loss of current efficiency due to the generation of oxygen, hypochlorite and chlorate, and $\eta NaOH$ and $\eta Na_2CO_3$ take into account NaOH and $Na_2CO_3$ introduced in the feed brine.

A CCE can be determined at a time prior to the membrane restoration process, according to the embodiments of the present disclosure, and a CCE can be determined at a time after the membrane restoration process, according to the embodiments of the present disclosure, and can be designated as $CCE_{Before}$ and $CCE_{After}$ respectively. The membrane restoration process, according to the embodiments of the present disclosure, may be more effective if performed before a particular $CCE_{Before}$ value is reached. For example, a membrane restoration process can be performed before a membrane has a $CCE_{Before}$ value of 96 percent, performed before a membrane has a $CCE_{Before}$ value of 95 percent, performed before a membrane has a $CCE_{Before}$ value of 93 percent, or performed before a membrane has a $CCE_{Before}$ value of 92 percent. The difference of $CCE_{Before}$ and $CCE_{After}$ can provide a change in CCE, as provided in Equation 2.

$$\Delta CCE = CCE_{Before} - CCE_{After} \quad \text{Equation 2.}$$

A $CCE_{After}$ value, subsequent a membrane restoration process, according to one or more embodiments of the present disclosure, which is greater than a $CCE_{Before}$ value can be considered as an indication of improved membrane performance.

Determining the performance of the membrane 110 can include determining a cell voltage. The cell voltage can be considered as including components such as a decomposition voltage, a membrane potential, electrode overpotentials, an ohmic drop in the membrane, an ohmic drop in electrolytes, and an ohmic drop in electrodes and conductors. A decomposition voltage of a chlor-alkali process including a cell can be about 2.20 volts, which can vary depending upon temperatures, concentrations, and/or pressures of the chlor-alkali process. A membrane potential can describe overpotentials at the surfaces of the membrane, and have a value of approximately 0.08 volts when a cell is operated at 3.0 $kA/m^2$, 90° C., and 32 weight percent caustic solution, such as a 32 weight percent sodium hydroxide solution. An electrode overpotential for chlorine can have a value of approximately 0.05 volts, at an operational condition of 3.0 $kA/m^2$ with a titanium anode having an iridium, ruthenium, or platinum oxide coating; an electrode overpotential for hydrogen can have a value of approximately 0.10 volts, at an operational condition of 3.0 $kA/m^2$ with an activated cathode that can include a nickel substrate having a coating that can include nickel, cobalt, ruthenium, or another coating, including coatings having another metal such as a precious metal. An ohmic drop in a commercially available membrane, operating at 3.0 $kA/m^2$, 90° C., and 32 weight percent caustic solution can have a value of about 0.25 volts to about 0.30 volts. An ohmic drop in an electrolyte can be minimized by minimizing gaps between the membrane and the electrode. An ohmic drop in electrodes and conductors can occur due to unfavorable current paths along a metallic structure and a chlor-alkali cell can have an ohmic drop of about 20 millivolts to about 40 millivolts at 3.0 $kA/m^2$.

For the various embodiments, a cell voltage can be determined at a time prior to a membrane restoration process according to the embodiments of the present disclosure, and a cell voltage can be determined at a time after a membrane restoration process according to the embodiments of the present disclosure, and can be designated as $U_{Before}$ and $U_{After}$, respectively. The difference of $U_{Before}$ and $U_{After}$ can provide a change in cell voltage, $\Delta U$, as provided in Equation 3.

$$\Delta U = U_{Before} - U_{After} \qquad \text{Equation 3}$$

A $U_{After}$ value, subsequent a membrane restoration process according to the embodiments of the present disclosure, which is less than a $U_{Before}$ value can be considered as an indication of improved membrane performance.

The power required to produce one metric ton of NaOH percent can be determined by the voltage drop over a cell and the NaOH current efficiency, as shown in Equation 4.

$$P_{CS}[\text{kWh/t } 100\% \text{ NaOH}] = 670.1 \frac{U_{cell}}{CCE} 100 \qquad \text{Equation 4}$$

where $U_{cell}$ = the cell voltage (volts)

$CCE$ = the NaOH current efficiency (%).

A reduction in power consumption can be determined as shown by Equation 5.

$$P_{CS,Reduction} = \frac{\left(\frac{U}{CCE}\right)_{Before}}{\left(\frac{U}{CCE}\right)_{After}}. \qquad \text{Equation 5}$$

Power consumption is an economic consideration in the operation of a cell process due to the cost of energy used in the process. A reduction in power consumption, from a point in time before a membrane restoration process, as described herein, to a point in time after the membrane restoration process, can be considered as an indication of improved membrane performance.

As discussed herein, the chlor-alkali process that produces chlorine and caustic soda can occur in the cell 100. The embodiments of the present disclosure can include stopping the cell 100 from a chlorine and caustic soda production process, such as the chlor-alkali process. Stopping a cell 100 from the chlorine and caustic soda production process can be considered as a cell process shutdown or as taking the cell 100 offline from the production process. A predetermined procedure, such as a standard operating procedure, can be followed to stop the cell 100. Stopping the cell 100 from the chlorine and caustic soda production process can include stopping the operating electrical current applied between the anode 102 and the cathode 106 via electrical connection 116. Stopping the cell 100 can further include stopping a process stream that provides input to the cell 100. Process streams that provide input to the cell 100 can include, but are not limited to, the anolyte compartment input 112, the catholyte compartment input 114, and the supplementary liquid input 134. A process stream can be stopped so that the cell 100 becomes depleted of reactants and products of the production process. After stopping a process stream to the cell 100, the cell 100 can be flushed to provide that the cell 100 is essentially empty of reactants and products of the production process. The cell 100 can be flushed with, among other things, deionized water and the membrane restoration process can be performed.

The embodiments of the present disclosure provide a membrane restoration process for use when the membrane 110 is removed from the cell 100. Removing the membrane 110 from the cell 100 can include stopping the cell 100 from a production process, such as the chlorine and caustic soda production process, as discussed herein. When the cell 100 has been shutdown or taken offline the cell 100 may be disassembled to remove the membrane 110.

The membrane 110 which has been removed from the cell 100 can be positioned so that the solution, as described herein, covers a portion of the membrane 110. For example, the removed membrane 110 can be flatly positioned so that the solution, as described herein, completely covers the membrane 110 such that both major surfaces of the membrane are contacted by the solution. For the various embodiments, the solution contacts the membrane 110 as discussed herein.

The membrane 110 that has contacted the solution for an interval of time, as discussed herein, can be separated from the solution, containing chelated metal, and the membrane 110 be flushed or rinsed with water, e.g., deionized water. The flushed or rinsed membrane 110 can be placed back into the cell 100. The reassembled cell 100 can be restarted to the production of chlorine and caustic soda.

While the present disclosure has been shown and described in detail above, it will be clear to the person skilled in the art that changes and modifications may be made without departing from the spirit and scope of the disclosure. As such, that which is set forth in the foregoing description and accompanying drawings is offered by way of illustration only and not as a limitation. The actual scope of the disclosure is intended to be defined by the following claims, along with the full range of equivalents to which such claims are entitled.

In addition, one of ordinary skill in the art will appreciate upon reading and understanding this disclosure that other variations for the disclosure described herein can be included within the scope of the present disclosure.

EXAMPLES

The following examples are given to illustrate, but not limit, the scope of this disclosure. Unless otherwise indicated, all parts and percentages are by weight. Unless otherwise specified, all instruments and chemicals used are commercially available.

Materials

Organic Acid: Oxalic Acid, >99% purity; available from Merck KGaA, Darmstadt, Germany.

Strong Base: Sodium Hydroxide, aqueous solution 32 weight percent NaOH; produced on site at the chlor-alkali membrane plant.

Chlor-Alkali Membrane Cell: bipolar electrolyzer as described in U.S. Pat. No. 4,734,180 to Sato the entire content of which is incorporated herein by reference.

Laboratory chlor-alkali cells: 200 milliliter (ml) cathode compartment, 500 ml anode compartment, electrode size 7.5×7.5 centimeter$^2$ (cm$^2$), cathode active coating as described in U.S. Pat. No. 5,645,930 to Tsou the entire content of which is incorporated herein by reference, anode active coating as described in U.S. Pat. No. 5,503,663 to Tsou the entire content of which is incorporated herein by reference.

Membranes: Asahi Kasei F4401; available from Asahi Kasei Chemicals Corporation, Tokyo, Japan.

Two F4401 membranes from the chlor-alkali membrane plant are used for the lab test. The membranes were 2 and 7 months online, respectively, with a catholyte temperature of about 90° C., a NaOH concentration of about 32 weight percent, a NaCl concentration of about 210 grams/liter in the anolyte, and a current density of about 5.5 kA/m² before they were removed from the production cell. Pieces are cut from the respective membranes, each piece having dimensions of 9 centimeters (cm)×9 cm, and are each placed into a laboratory chlor-alkali cell. Example 1 is designated as the process with the membrane having been run for 2 months, and Example 2 is designated as the process with the membrane having been run for 7 months. The laboratory chlor-alkali cells include an anode compartment, a brine inlet, current connections, a chlorine outlet, a depleted brine outlet, a heating rod, a cell temperature indicator, a brine lugging capillary, a cathode compartment, a water inlet, a hydrogen outlet, a caustic outlet, and a caustic lugging capillary.

Brine, which is approximately 26 weight percent NaCl, and deionized water, at purities used for the F4401 membrane, are fed to storage tanks which respectively feed the cell via the brine inlet and the water inlet. The distance between the cathode and anode surfaces is about 0 millimeters (mm) to 2.7 mm.

A temperature of approximately 85° C., a current density of approximately 4 kA/m², and a caustic concentration of about 31 to 32.5 weight percent is maintained for about 24 hours. After about 24 hours the current density is increased to 5.5 kA/m², the temperature is increased to 90° C., and the water and brine feeds are increased to maintain a caustic concentration of about 32 percent and a salt concentration in the anolyte of about 210 grams per liter. $U_{Before}$ and $CCE_{Before}$ are recorded for each laboratory cell after stabilization which occurs at 2-7 days. $U_{Before}$ is measured between the anode and the cathode by a Fluke handheld voltage meter having a 2 mV accuracy. $CCE_{Before}$ is obtained by determination of the caustic produced at a given time interval divided by the theoretical caustic amount determined by the Faraday Law at the given time interval and current flow.

Oxalic acid is diluted with deionized water to 0.2 moles/liter (M). Thirty-two weight percent sodium hydroxide solution is added to adjust the pH of the solution to 5. The laboratory cells are shut down by switching off the operating electrical current. The cell is flushed after draining the anolyte and the catholyte, by feeding deionized water to the cathode compartment and the anode compartment, and then draining and discarding the deionized water. This is repeated two times. The solution is pumped to the catholyte compartment and then the anolyte compartment of the laboratory cells while an electric current is applied, via the cathode protection rectifier, between the anode and the cathode to achieve a cell voltage of about 1.6 to about 2 volts (V) between cathode and anode. A solution temperature of about 45° C. is maintained by the cell's heating rods. The solution is kept in the anolyte compartment and the catholyte compartment of the cells for about 8 hours while the cathode protection rectifier maintains a cell voltage of 1.6 to 2 V between the anode and the cathode.

The solution is removed from the anolyte compartments and the catholyte compartments, and the cathodic protection rectifier is shut off after the solution is removed from cell. The compartments are flushed with deionized water twice. The cell is restarted by following standard procedure and run at same conditions as before the restoration process. $U_{After}$ and $CCE_{After}$ are determined for each laboratory cell after stabilization that occurs in 2 to 7 days.

The data gathered before the membrane restoration and the data gathered after the membrane restoration is analyzed.

Example 1

$U_{Before} = 3,265$ mV $U_{After} = 3,083$ mV $\Delta U = 3,265 - 3,083 \approx +182$ mV $CCE_{Before} = 94.6$ $CCE_{After} = 95.6$ $\Delta CCE = 94.6 - 95.6 \approx -1\%$ $$P_{CS,Reduction} = \frac{\left(\frac{3,265}{94.6}\right)}{\left(\frac{3,083}{95.6}\right)} = (1.07 - 1.00)100 \approx 7\%$$

The data and calculations for Example 1 show that after membrane restoration the cell voltage is reduced by 182 mV and that the caustic current efficiency is improved by 1%. These improvements result in a power consumption reduction of 7 percent.

Example 2

$U_{Before} = 3,224$ mV $U_{After} = 3,155$ mV $\Delta U = 3,224 - 3,155 \approx +90$ mV $CCE_{Before} = 92.9$ $CCE_{After} = 92.0$ $\Delta CCE = 92.9 - 92.0 \approx +0.9\%$ $$P_{CS,Reduction} = \frac{\left(\frac{3,244}{92.9}\right)}{\left(\frac{3,155}{92.0}\right)} = (1.018 - 1.000)100 \approx 1.8\%$$

The data and calculations for Example 2 show that after membrane restoration the cell voltage is reduced by 90 mV. In Example 2 the caustic current efficiency is reduced by 0.9 percent. However, Example 2 results in a power consumption reduction of 1.8 percent.

Both Example 1 and Example 2 provide data which indicates that the membrane rejuvenation process is successful for improving a membrane's performance.

Example 3

Additional pieces of the Example 2 membrane (7 months on line) are cut for extraction method analysis to determine contaminates on the membrane. The results are shown in Table 1.

TABLE 1

| Contaminates | Contaminate deposition on membrane milligram/square decimeter (mg/dm²) |
|---|---|
| Aluminum | 1.29 |
| Barium | 0.29 |
| Calcium | 0.24 |
| Cobalt | 0.83 |
| Copper | 0.62 |
| Iron | 0.73 |
| Magnesium | 0.31 |
| Nickel | 6.45 |
| Silicon | 0.18 |
| Strontium | 1.25 |

Additional pieces of the Example 2 membrane (7 months on line) are cut to dimensions of 9 cm×9 cm, and are each placed into laboratory beakers so that the pieces are flat.

Oxalic acid is diluted with deionized water to 0.2 M. Thirty-two weight percent sodium hydroxide solution is added to adjust the pH of the solution to 5. Approximately 500 ml of the solution is placed into each laboratory beaker to cover the membrane in the laboratory beaker. For sample 1 the solution is maintained at about 18° C. for 8 hours while contacting the membrane; for sample 2 the solution is maintained at about 45° C. for 8 hours while contacting the membrane; for sample 3 the solution is maintained at about 80° C. for 8 hours while contacting the membrane. The solutions are removed from the laboratory beakers and the amount and type of contaminants from each sample are determined by ICP (Inductively Coupled Plasma) emission spectrometry using an Ultima 2 emission spectrometer, (available from HORIBA Jobin Yvon Inc., Edison, N.J.). The results are shown in Table 2.

TABLE 2

| Contaminants removed milligram/square decimeter (mg/dm²) | Sample 1 | Sample 2 | Sample 3 |
|---|---|---|---|
| Aluminum | 0.183 | 0.349 | 0.456 |
| Barium | 0.063 | 0.080 | 0.109 |
| Calcium | 0.067 | 0.068 | 0.059 |
| Cobalt | 0.183 | 0.349 | 0.417 |
| Copper | 0.213 | 0.298 | 0.273 |
| Iron | 0.219 | 0.397 | 0.349 |
| Magnesium | 0.059 | 0.106 | 0.160 |
| Nickel | 2.643 | 3.245 | 3.000 |
| Silicon | 0.212 | 0.400 | 0.586 |
| Strontium | 0.069 | 0.074 | 0.057 |

Example 3 provides data which indicates that the membrane restoration process is successful for removing a contaminant from a membrane.

Additionally, because the solution used for the membrane restoration process contains $Na^+$ ions, no after-treatment of the membrane is necessary and the membrane can be returned to the chlor-alkali membrane cell process immediately following a membrane restoration process.

What is claimed is:

1. A membrane restoration process, comprising:
   draining an anolyte and a catholyte from a cell, where the cell includes an anode, a cathode and a membrane fouled with a metal
   replacing the anolyte and the catholyte of the cell with a buffer solution of the same composition having a weak acid and its conjugate base;
   forming a chelate with the metal and the weak acid of the buffer solution; and
   providing an electric current between the anode and the cathode of the cell to protect the cell from corrosion while forming the chelate.

2. The process as in claim 1, where the weak acid is selected from the group consisting of oxalic acid, citric acid, acetic acid, and combinations thereof.

3. The process as in claim 1, where the buffer solution includes a strong base, and where the strong base is selected from the group consisting of alkalis, alkaline earth metal hydroxides, and combinations thereof.

4. The process as in claim 3, where the strong base is sodium hydroxide.

5. The process as in claim 1, where the buffer solution has a pH of about 2 to about 7.

6. The process as in claim 1, where the buffer solution remains in the cell for a time of about 0.5 hours to about 48 hours.

7. The process as in claim 1, including maintaining the buffer solution in the cell at a temperature of about 0° C. to about 90° C.

8. A method for protecting a cathode of a cell from corrosion, comprising:
   draining an anolyte and a catholyte from a cell, where the cell includes an anode, a cathode and a membrane fouled with a metal
   contacting the anode, the cathode and the membrane of the cell with a buffer solution of the same composition having a solute that can form a chelate with a metal that fouls the membrane; and
   providing a cell voltage between the anode and the cathode to protect the cathode of the cell from corrosion while the solute forms a chelate with the metal that fouls the membrane.

9. The method of claim 8, where providing the cell voltage includes providing a cell voltage of about 1.6 volts to about 2.0 volts between the anode and the cathode.

10. The method of claim 8, where providing the cell voltage includes providing a direct current between the anode and the cathode to achieve the cell voltage.

11. The method of claim 8, where the solute includes weak acid selected from the group consisting of oxalic acid, citric acid, acetic acid, and combinations thereof.

12. The method of claim 11, where the solute includes a strong base, and where the strong base is selected from the group consisting of alkalis, alkaline earth metal hydroxides, and combinations thereof.

13. The method of claim 12, where the strong base is sodium hydroxide.

14. The method of claim 8, where the buffer solution has a pH of about 2 to about 7.

15. The method of claim 8, where contacting the anode, the cathode and the membrane of the cell with the buffer solution is for a time of about 0.5 hours to about 48 hours.

16. The method of claim 8, including maintaining the buffer solution in the cell at a temperature of about 0° C. to about 90° C.

* * * * *